(No Model.)
M. F. DEININGER.
NUT LOCK.
No. 498,631.  Patented May 30, 1893.
Fig. 1
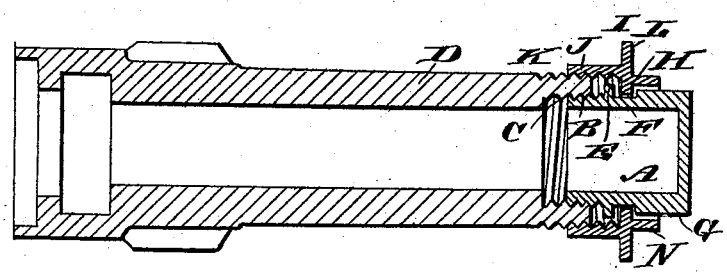
Fig. 2  Fig. 3
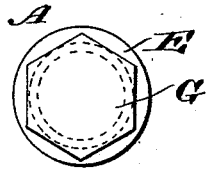 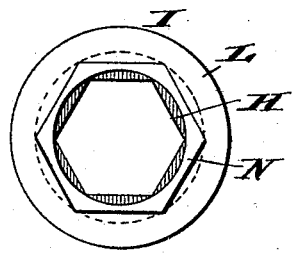
Fig. 4
WITNESSES:  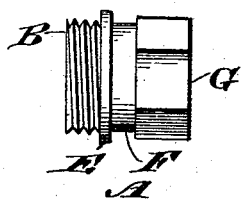  INVENTOR
H. Walker                              M. F. Deininger
C. Sedgwick                         BY Munn & Co
                                            ATTORNEYS.

UNITED STATES PATENT OFFICE.

MICHAEL F. DEININGER, OF BROOKLYN, NEW YORK.

NUT-LOCK.

SPECIFICATION forming part of Letters Patent No. 498,631, dated May 30, 1893.

Application filed January 13, 1893. Serial No. 458,208. (No model.)

*To all whom it may concern:*

Be it known that I, MICHAEL F. DEININGER, of Brooklyn, in the county of Kings and State of New York, have invented a new and Improved Nut-Lock, of which the following is a full, clear, and exact description.

The object of the invention is to provide a new and improved nut lock, which is simple and durable in construction, very effective in operation, and more especially designed to securely lock axle nuts in place.

The invention consists of a nut engaging a nut to be locked and screwing in an opposite direction.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement as applied to an axle skein. Fig. 2 is a face view of the nut to be locked. Fig. 3 is a like view of the locking nut; and Fig. 4 is a side elevation of the nut to be locked.

The improvement is applied on a nut A, formed at one end with a thread B, engaging an interior thread C, formed on the axle skein D. In the rear of the thread B is formed an annular flange E, from which extends for a short distance the cylindrical part F, of the nut A and next to the cylindrical part is a polygonal head G, adapted to be taken hold of by a wrench or other suitable tool in screwing up or unscrewing the nut A from or on the skein D. The cylindrical part F is adapted to be engaged by an interior end flange H, formed on the locking nut I, provided with an interior thread J, screwing on the exterior thread K, formed on the skein D. The thread J of the locking nut I extends in an opposite direction to the thread C of the nut A to be locked. It is understood that the interior thread C is correspondingly arranged in an opposite direction to that of the exterior thread K on the skein D. The locking nut I is also formed with an annular exterior flange L, adapted to abut against the hub of the wheel to limit the inner movement of the said locking nut. The locking nut I is further provided with a polygonal head N, adapted to be taken hold of by a wrench or other suitable tool for conveniently screwing the said nut on the skein. The head N is hollow and of sufficient size to permit the head G of the nut to be locked to pass through it. The interior flange H of the locking nut I is polygonal in shape, as will be readily understood by reference to Fig. 3, the said polygonal shape corresponding to the polygonal head G of the nut to be locked.

The device is used as follows: In order to apply the nut A and the locking nut I, both are screwed simultaneously on the skein D and for this purpose the ends have to be turned in opposite directions according to their screw threads. As shown, the thread C is a right-hand thread and consequently the head G is turned from right to left, while the other thread of the locking nut is a left-handed thread and is turned from left to right. Now, it will be seen that the annular flange H of the locking nut I engages the cylindrical part F of the nut A to be locked, so that when the two nuts are finally screwed up on the skein D, the said annular interior flange H is still in engagement with the annular part F, and the inner end of the polygonal head G extends onto the face of the annular interior flange H. Consequently, when the nut A should unscrew it abuts with its annular flange E against the inner surface of the annular flange H and further outward screwing is prevented, as the nut I in order to unscrew would have to turn in an opposite direction to that of the nut A. The locking nut I is prevented from unscrewing accidentally, as its annular flange H will come in contact with the inner end of the head G, as the nut A unscrews in an opposite direction to that of the locking nut I, the latter being prevented from unscrewing unless the nut A is turned in an opposite direction. Thus, it will be seen that one nut locks the other in place, thus preventing accidental unscrewing of either of the two nuts. For removing the nut A it is necessary that the nut A be turned in the direction for unscrewing, while the nut I is turned in an opposite direction also for unscrewing, so that both nuts turn simultaneously in opposite directions whereby the annular flange H is retained in the circular part F which permits the turning of the two nuts independent of each other.

Having thus fully described my invention, I claim as new and desire to secure by Letters Patent—

1. The combination with a nut provided at its inner end with external threads, of a tubular locking nut mounted upon the first named nut to rotate thereon and provided at its inner end with internal threads extending oppositely to the threads of the first nut; an annular space being formed between the adjacent threaded faces of said two nuts to receive the part to which they are to be applied, substantially as set forth.

2. A nut lock provided with a locking nut screwing in an opposite direction to the nut to be locked, and an interior polygonal flange formed on the said locking nut and engaging a circular part on the nut to be locked, substantially as shown and described.

3. A nut lock provided with a locking nut screwing in an opposite direction to the nut to be locked, and provided with an interior polygonal flange engaging the nut to be locked on a circular part between an annular flange and the polygonal head of the nut to be locked, substantially as shown and described.

4. The combination with a nut having an exterior screw thread, an annular flange and a polygonal head between which and the said flange is a circular part, of a locking nut formed with an interior screw thread extending in an opposite direction to the said exterior screw thread, and an interior polygonal flange formed on the said locking nut and adapted to engage the said cylindrical part of the other nut, substantially as shown and described.

MICHAEL F. DEININGER.

Witnesses:
EDWD. M. CLARK,
THEO. G. HOSTER.